(12) United States Patent
Huang et al.

(10) Patent No.: US 8,582,222 B2
(45) Date of Patent: Nov. 12, 2013

(54) AUTOFOCUS MODULE

(75) Inventors: Chen-Yi Huang, Taichung (TW);
Te-Sheng Tseng, Taichung (TW);
Wen-Hung Hsu, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 39 days.

(21) Appl. No.: 13/045,660

(22) Filed: Mar. 11, 2011

(65) Prior Publication Data

US 2012/0113536 A1 May 10, 2012

(30) Foreign Application Priority Data

Nov. 4, 2010 (TW) ................................ 99137910 A

(51) Int. Cl.
| | | |
|---|---|---|
| *G02B 7/02* | (2006.01) | |
| *G02B 15/14* | (2006.01) | |
| *G02F 1/29* | (2006.01) | |
| *G03B 13/00* | (2006.01) | |
| *G03B 13/18* | (2006.01) | |

(52) U.S. Cl.
USPC ........... 359/824; 359/319; 359/698; 348/345; 396/89

(58) Field of Classification Search
USPC ......... 359/824, 319, 698, 822, 823, 694, 697; 348/345; 396/89
See application file for complete search history.

(56) References Cited

U.S. PATENT DOCUMENTS

| 3,634,740 | A * | 1/1972 | Stevko ........................... 361/234 |
| 2006/0098969 | A1 * | 5/2006 | Asai et al. ........................ 396/89 |
| 2008/0165427 | A1 * | 7/2008 | Tseng et al. .................. 359/666 |
| 2011/0242403 | A1 * | 10/2011 | Kawamura et al. ........... 348/360 |
| 2011/0274372 | A1 * | 11/2011 | Bianchi et al. ................ 382/321 |

* cited by examiner

*Primary Examiner* — Dawayne A Pinkney
(74) *Attorney, Agent, or Firm* — Morris Manning & Martin LLP; Tim Tingkang Xia, Esq.

(57) ABSTRACT

The present invention provides an autofocus module including: a supporting base, an electrical focusing element and an conductive element, wherein the supporting base at least accommodates one lens element, the electrical focusing element is disposed at one end of the supporting base so that the electrical focusing element and the lens element are positioned along a common optical lens, and the conductive element is embedded in the supporting base and connected to the electrical focusing element and an external power source respectively. The electrical focusing element obtains power through the conductive element, and by controlling the power magnitude supplied to the electrical focusing element, the focal length thereof can be changed accordingly, thereby carrying out the autofocus operation.

6 Claims, 7 Drawing Sheets

AUTOFOCUS MODULE

CROSS-REFERENCE TO RELATED APPLICATION

This non-provisional application claims priority under 35 U.S.C. §119(a) on Patent Application No. 099137910 filed in Taiwan, R.O.C. on Nov. 4, 2010, the entire contents of which are hereby incorporated by reference.

BACKGROUND OF THE INVENTION

1. Field of the Invention

The present invention relates to a lens structure, and more particularly, to an autofocus module.

2. Description of the Prior Art

With the rapid development of consumer electronics, there is an ever increasing need to keep the products as compact as possible, and accordingly, the internal product components are required to have their size minimized so as to make the whole product more compact and portable. Also, there is an increasing need for imaging products featuring variable focal length, which drives the demand for imaging products with a motor-driven autofocus mechanism. An example of a conventional autofocus module is described below. The autofocus module includes a conductive metal coating on its external wall surface and its upper surface, so that an electrical focusing element and a sensor can be electrically connected:

FIG. 1A is a top view of a conventional autofocus module; FIG. 1B is a cross-sectional view of the autofocus module in FIG. 1A along line A-A in the same figure. FIG. 2A is a top view of the conventional autofocus module with part of the components removed; FIG. 2B is a cross-sectional view of the autofocus module in FIG. 2A along line B-B in the same figure. A conventional autofocus module 10 includes a focusing element supporting base 11, an electrical focusing element 12, a lens supporting base 13, a lens element 14, and a sensor 15. The focusing element supporting base 11 includes a focusing element accommodating space 16 and is provided with a light passing hole. The electrical focusing element 12 is accommodated within the focusing element accommodating space 16, wherein the curvature of the electrical focusing element 12 changes in accordance with the power supplied to carry out the autofocus operation. The lens supporting base 13 is provided with a thread 17 on the inner side, so that it can be assembled with the lens element 14. Moreover, the lens supporting base 13 has a conductive metal coating 18 on its external surface, and the electrical focusing element 12 and the sensor 15 can be electrically connected through the conductive metal coating 18. The sensor 15 includes a sensor base 19 and a sensor element 20, wherein the sensor base 19 is provided with a power terminal. Different amount of power coming from the power terminal drive the electrical focusing element 12, and the autofocus operation can be done. However, a conventional autofocus module, like the autofocus module 10 described above, has several drawbacks.

First, the conduction performance of the conductive metal coating is not stable. Second, it is not easy to form the conductive metal coating. Third, the conductive metal coating has a substantial part exposed outside, making the metal coating easily oxidized; or otherwise, the exposed metal coating may have unnecessary contact or connection with other components and thus wears out or peels off easily. Therefore, a need exists in the art to improve conventional autofocus modules.

SUMMARY OF THE INVENTION

An objective of the present invention is to lower processing cost and to increase economic efficiency in manufacture.

To achieve the above objective, the present invention provides an autofocus module including: a supporting base, an electrical focusing element and a conductive element, wherein the supporting base at least accommodates one lens element, the electrical focusing element is disposed at one end of the supporting base so that the electrical focusing element and the lens element are positioned along a common optical lens, and the conductive element is embedded in the supporting base and electrically connected to the electrical focusing element and an external power source respectively.

DETAILED DESCRIPTION OF THE PREFERRED EMBODIMENTS

The present invention now will be described more fully hereinafter with reference to the accompanying drawings, in which preferred embodiments of the present invention are shown.

Figure 1A:
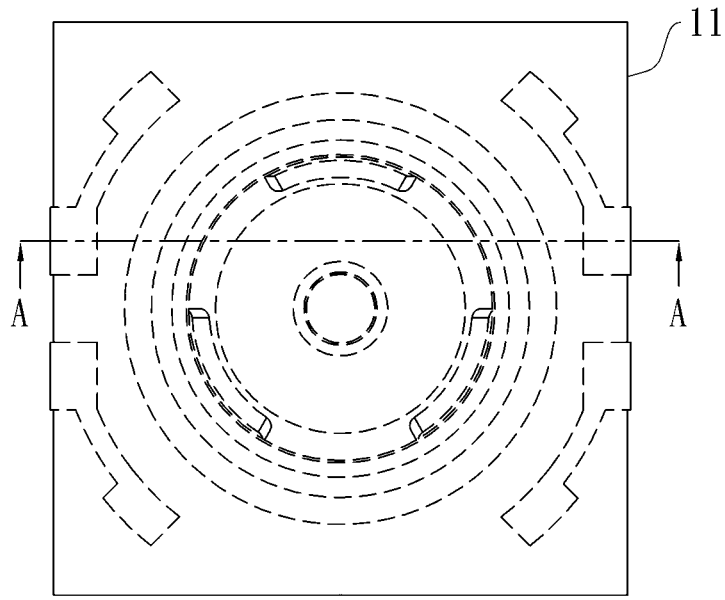
FIG. 1A is a top view of a conventional autofocus module.
Figure 1B:
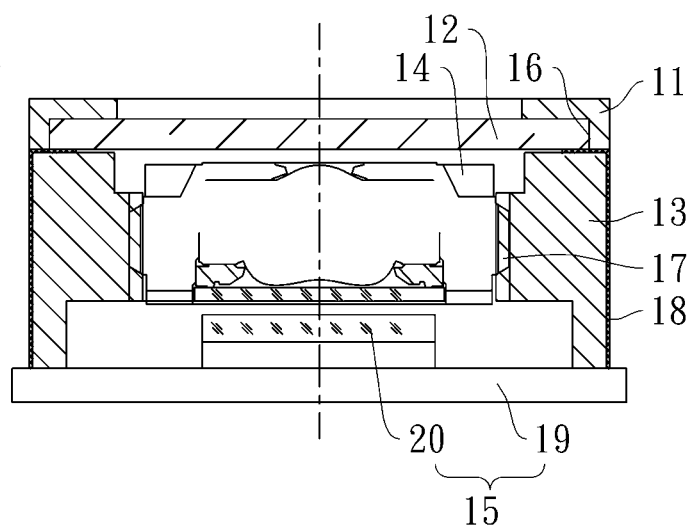
FIG. 1B is a cross-sectional view of the autofocus module in FIG. 1A along line A-A in the same figure.
Figure 2A:
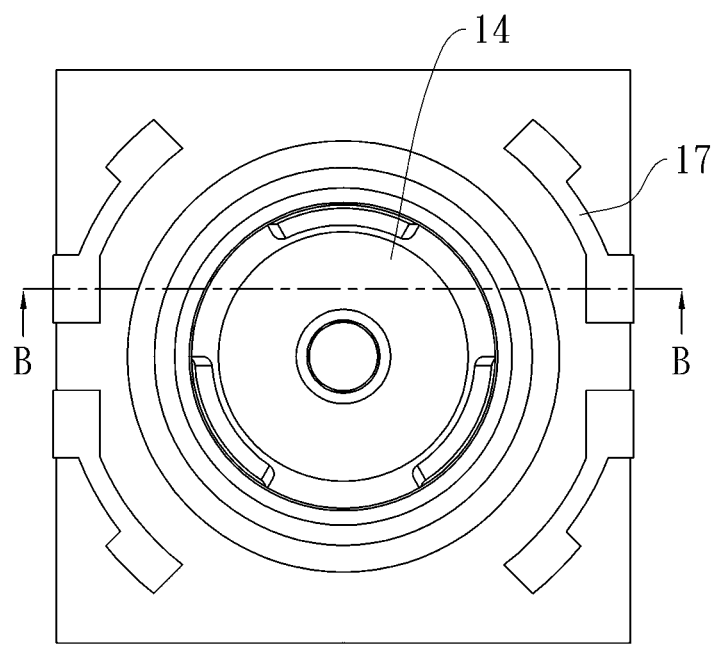
FIG. 2A is a top view of the conventional autofocus module with part of the components removed.
Figure 2B:
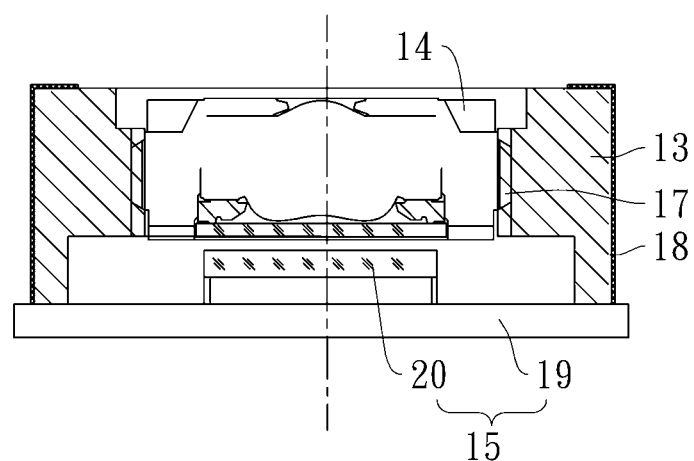
FIG. 2B is a cross-sectional view of the autofocus module in FIG. 2A along line B-B in the same figure.
Figure 3A:
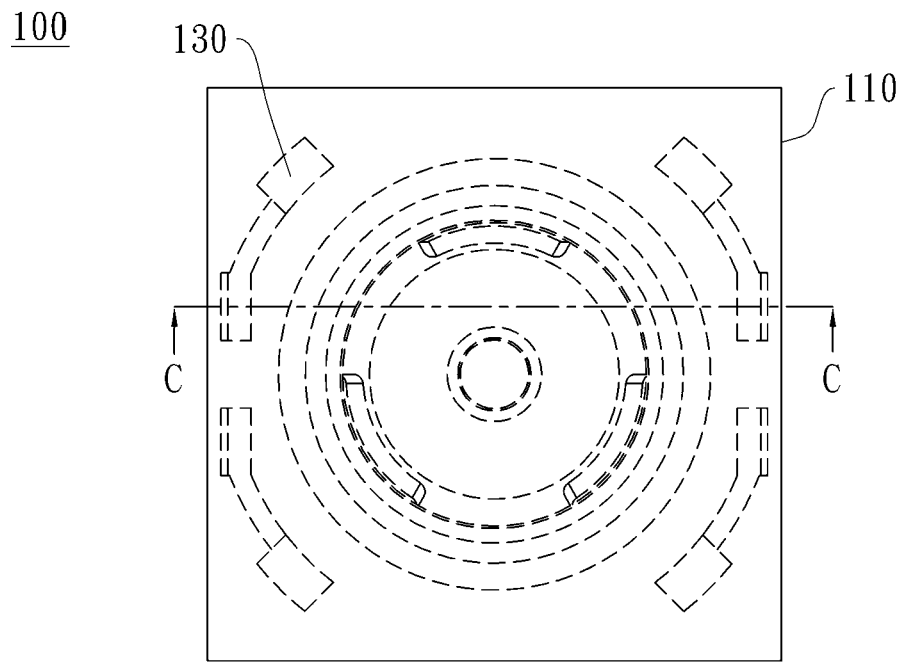
FIG. 3A is a top view of an autofocus module according to a first embodiment of the present invention.
Figure 3B:
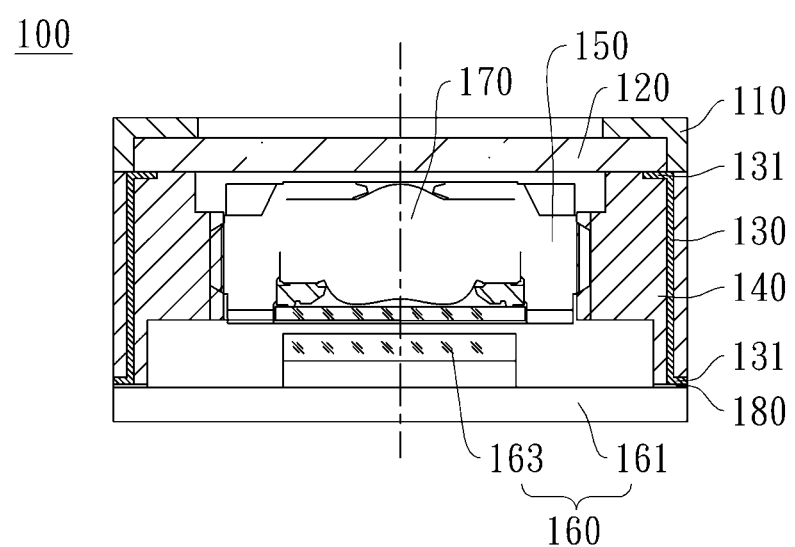
FIG. 3B is a cross-sectional view of the autofocus module in FIG. 3A along line C-C in the same figure.

Referring to FIGS. 3A and 3B, FIG. 3A is a top view of an autofocus module according to a first embodiment of the present invention; FIG. 3B is a cross-sectional view of the autofocus module in FIG. 3A along line C-C in the same figure. In this embodiment, an autofocus module 100 of the present invention includes a focusing element supporting base 110, an electrical focusing element 120, at least one conductive element 130, a lens supporting base 140, a lens unit 150, and a sensor 160, wherein the lens unit 150 includes at least one lens element 170.

The focusing element supporting base 110 contains an accommodating space that runs from one end to the other. The electrical focusing element 120 may include a liquid lens, for example; preferably, the electrical focusing element 120 has a flat shape. The electrical focusing element 120 and the focusing element supporting base 110 are assembled with each other, positioned above the lens supporting base 140. The conductive element 130, which is made of a conductive material, is assembled with the focusing element supporting base 110 and in contact with the electrical focusing element 120. The lens unit 150 and the electrical focusing element 120 move along a common optical axis, and the lens unit 150 is connected to the lens supporting base 140 by a thread. The sensor 160 includes a sensor base 161, in this case a printed circuit board (PCB), provided with a plurality of power supply sections 162 (shown in FIG. 5A) on at least one side of the sensor base 161; also, the sensor 160 and the lens supporting base 140 are assembled with each other. The focusing element supporting base 110, the lens supporting base 140 and the sensor 160 are assembled together, with the lens supporting base 140 positioned in-between.

The conductive element 130 is formed through stamping and embedded into the lens supporting base 140; moreover, the conductive element 130 has at least two terminals 131 extending horizontally. The two terminals 131 are respectively formed at the top and bottom ends of the conductive element 130 to be connected to the electrical focusing element 120 and the power supply sections 162 of the sensor base 161 respective. Preferably, the terminal 131 of the conductive element 130 is connected to the power supply section 162 of the sensor base 161 by using a conductive adhesive 180. Additionally, the terminal 131 of the conductive element 130 and the electrical focusing element 120 may also be connected by using a conductive adhesive (not shown).

Referring to FIG. 3B, when power is supplied to the power supply section 162 of the sensor base 161, the current will flow from the power supply section 162 to the terminal 131 of the conductive element 130, and will then flow through the electrical focusing element 120. By controlling the magnitude of power supplied to the electrical focusing element 120, the focal length thereof can be changed accordingly, thereby producing the autofocus effect. With the present invention, both the number of optical lens elements and the complexity of components within the module can be reduced, and in consequence, production cost is significantly reduced.

Figure 4A:
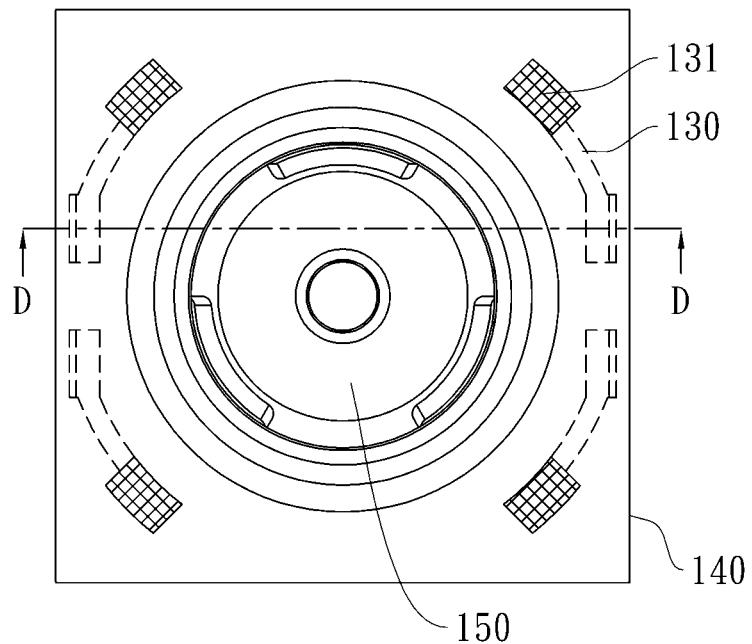
FIG. 4A is a top view of the autofocus module according to a first embodiment of the present invention with part of the components removed.
Figure 4B:
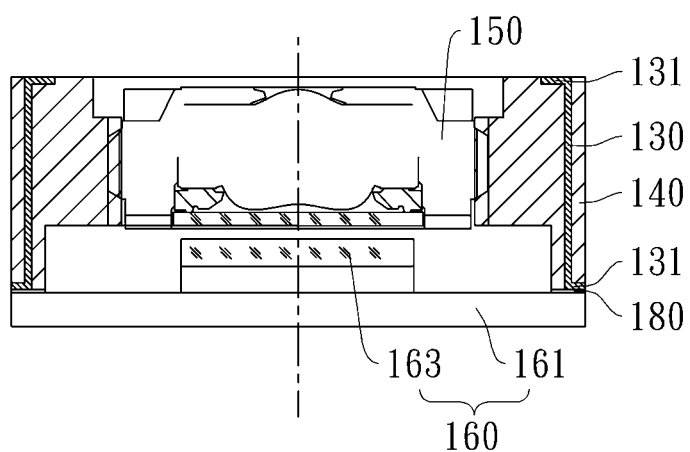
FIG. 4B is a cross-sectional view of the autofocus module in FIG. 4A along line D-D in the same figure.
Figure 5A:
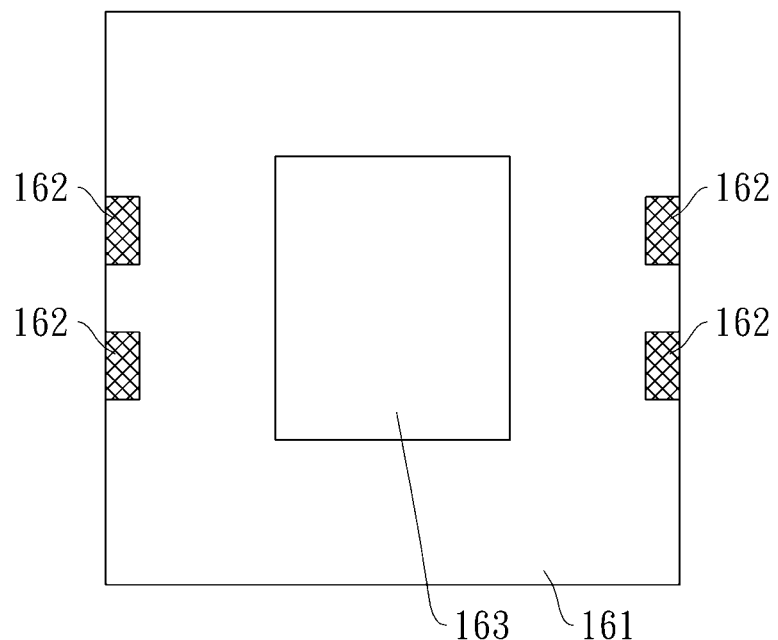
FIG. 5A is a top view of a sensor according to the present invention.
Figure 5B:
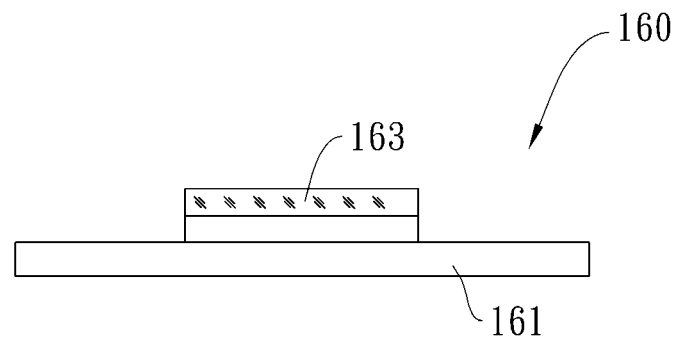
FIG. 5B is a side view of a sensor according to the present invention.

To sum up, in the present invention, the focusing element supporting base 110 is connected to the lens supporting base 140 by the electrical focusing element 120; moreover, the foregoing components and the conductive element 130, the sensor 160 are connected with one another, wherein the curvature of the electrical focusing element 120 changes in accordance with the power supplied so that the autofocus operation can be done. FIG. 4A is a top view of the autofocus module 100 according to a first embodiment of the present invention, with the focusing element supporting base 110 and the electrical focusing element 120 being removed; FIG. 4B is a cross-sectional view of the autofocus module 100 in FIG. 4A along line D-D in the same figure. FIG. 5A is a top view of the sensor 160 according to the present invention, and FIG. 5B is a side view of the same. The sensor 160 includes the sensor base 161 and a sensor element 163 on the sensor base 161. Also, the sensor base 161 is provided with a plurality of the power supply sections 162 on its sides. The connection patterns between every two components are described as above.

Figure 6A:
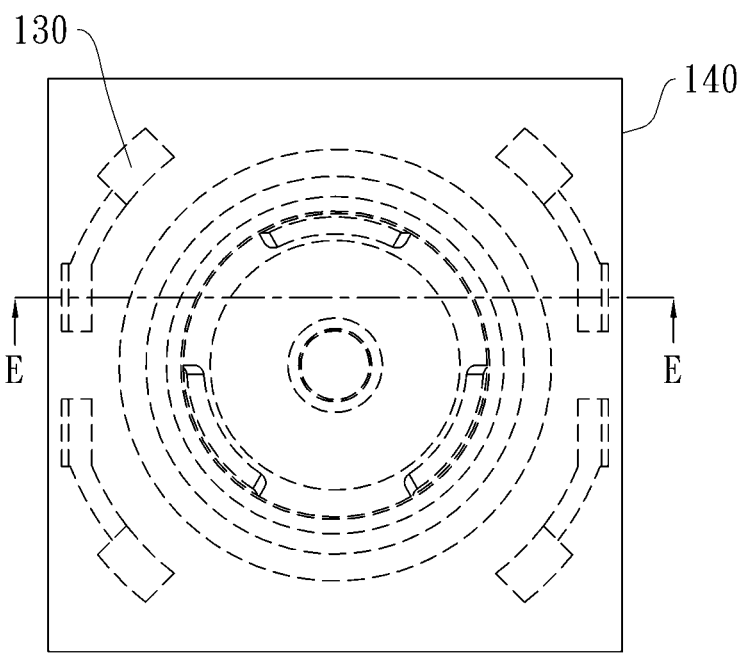
FIG. 6A is a top view of an autofocus module according to a second embodiment of the present invention.
Figure 6B:
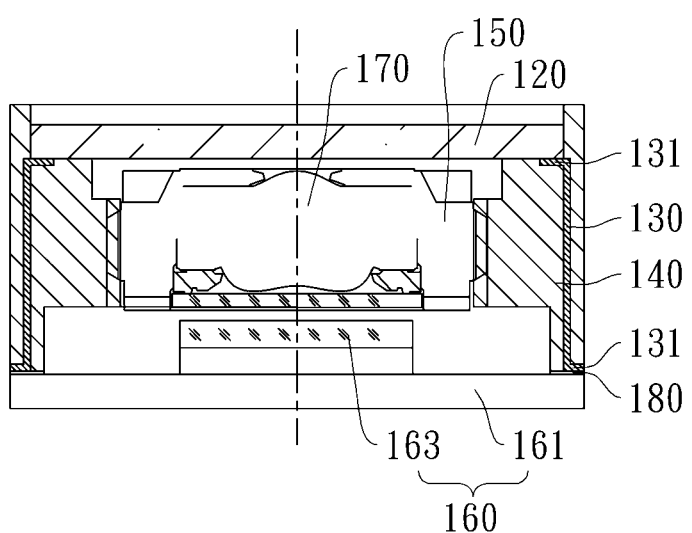
FIG. 6B is a cross-sectional view of the autofocus module in FIG. 6A along line E-E in the same figure.

FIG. 6A is a top view of an autofocus module according to a second embodiment of the present invention; FIG. 6B is a cross-sectional view of the autofocus module in FIG. 6A along line E-E in the same figure. In the second embodiment, the autofocus module 200 includes an electrical focusing element 120, at least one conductive element 130, a lens supporting base 140, a lens unit 150, and a sensor 160.

The difference between the autofocus modules in the first and second embodiments (respectively shown in FIGS. 3B and 6B) is that the autofocus module in the second embodiment (shown in FIG. 6B) does not include a focusing element supporting base 110. In the second embodiment, the electrical focusing element 120 is directly assembled with the upper part of the lens supporting base 140. The connection and assembling patterns between every component within the autofocus module in the second embodiment are the same as those in the first embodiment.

Figure 7A:
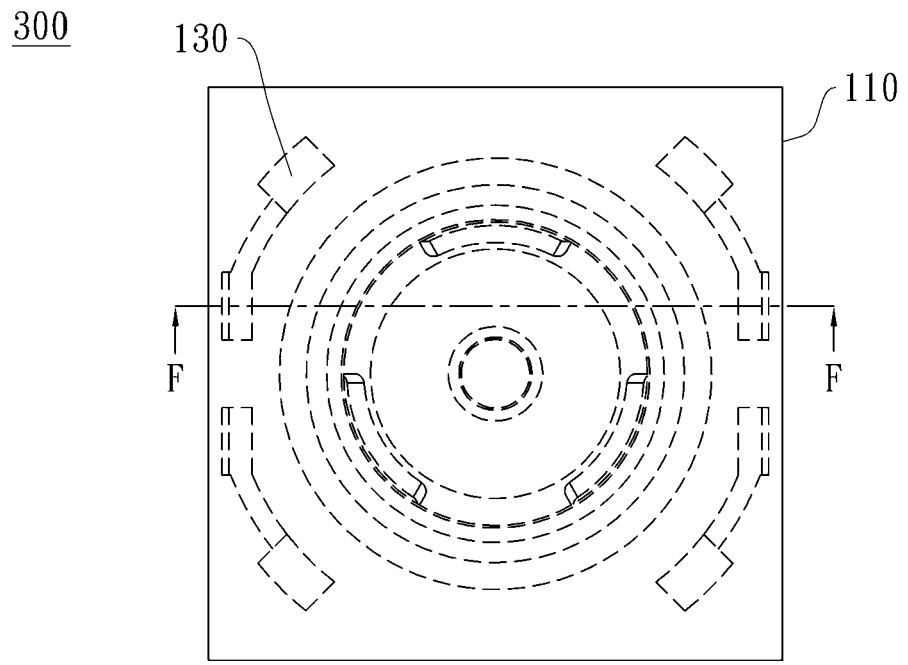
FIG. 7A is a top view of an autofocus module according to a third embodiment of the present invention.
Figure 7B:
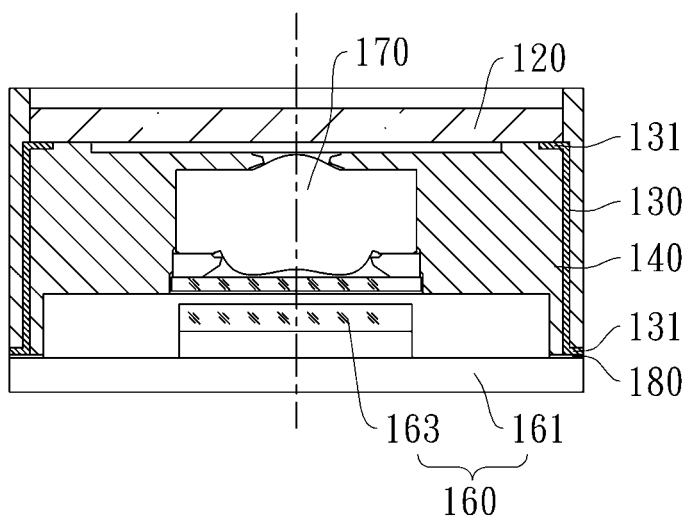
FIG. 7B is a cross-sectional view of the autofocus module in FIG. 7A along line F-F in the same figure.

FIG. 7A is a top view of an autofocus module according to a third embodiment of the present invention; FIG. 7B is a cross-sectional view of the autofocus module in FIG. 7A along line F-F in the same figure. In the third embodiment, the autofocus module 300 includes an electrical focusing element 120, a conductive element 130, a lens supporting base 140, and a sensor 160.

The difference between the autofocus modules in the first and third embodiments (respectively shown in FIGS. 3B and 7B) is that the autofocus module in the third embodiment (shown in FIG. 7B) does not include a focusing element supporting base 110 and a lens unit 150. In the third embodiment, the electrical focusing element 120 is directly assembled with the upper part of the lens supporting base 140, and at least one lens element 170 is assembled with the lens supporting base 140 and positioned inside it. The connection and assembling patterns between every component within the autofocus module in the third embodiment are the same as those in the first embodiment.

A common and important feature of the first, second and third embodiments of the present invention is that the curvature of the electrical focusing element changes in accordance with the power supplied, so that the focal length of the electrical focusing element can be changed accordingly to carry out the autofocus operation. The present invention allows the complexity of components within the module to be reduced; as a result, utilization of the accommodating space can be improved, and the size of the autofocus module can be further reduced. Moreover, the present invention allows the amount of components to be reduced; consequently, the assembling process can become easier, the processing cost can be lowered, and the production efficiency can be improved.

To conclude, the present invention has the following advantages:
1. The conductive element is embedded into the lens supporting base first before the whole lens supporting base is formed through insert-molding, and thus, the manufacturing process is simplified.
2. The conductive element does not have a substantial part exposed outside, and thus, unnecessary contact or connection with other components can be avoided.
3. The amount of components of the module is reduced, and thus, production cost can be lowered.

While this invention has been described by way of examples and in terms of preferred embodiments, it is to be understood that this invention is not limited hereto, and that various changes, substitutions, and alterations can be made herein without departing from the spirit and scope of this invention as defined by the appended claims.

What is claimed is:
1. An autofocus module, including: a supporting base, an electrical focusing element and at least an conductive element, wherein
the supporting base at least accommodates one lens element;
the electrical focusing element is disposed at one end of the supporting base so that the electrical focusing element and the lens element are positioned along a common optical lens; and the conductive element is embedded in the supporting base which is formed through insert-molding, the conductive element is connected to the electrical focusing element through a first terminal of the conductive element and connected to an external power source through a second terminal of the conductive element respectively, and the conductive element is one continuous piece and completely embedded inside the supporting base such that only an end surface of the second terminal of the conductive element is exposed outside the supporting base, wherein the end surface of the second terminal is coplanar with a surface of the supporting base.

2. The autofocus module according to claim 1, wherein the electrical focusing element has a flat shape.

3. The autofocus module according to claim 1, further including a sensor disposed at another end of the supporting base, wherein the sensor includes a sensor base, and at least one side of the sensor base is provided with a power supply section electrically connected to the conductive element.

4. The autofocus module according to claim 1, wherein the conductive element is formed through stamping.

5. The autofocus module according to claim 1, wherein the first terminal of the conductive element is electrically connected to the electrical focusing element by using a conductive adhesive.

6. The autofocus module according to claim 1, wherein the second terminal of the conductive element is electrically connected to the power supply section of the sensor base by using a conductive adhesive.

* * * * *